United States Patent
Rao et al.

(10) Patent No.: US 6,499,446 B1
(45) Date of Patent: *Dec. 31, 2002

(54) VARIABLE COMPRESSION RATIO CONNECTING ROD LOCKING MECHANISM I

(75) Inventors: V. Durga Nageswar Rao, Bloomfield Hills; Mark Michael Madin, Canton; Yash Andrew Imai, Troy, all of MI (US)

(73) Assignee: Ford Global Technologies, Inc., Dearborn, MI (US)

(*) Notice: Subject to any disclaimer, the term of this patent is extended or adjusted under 35 U.S.C. 154(b) by 127 days.

This patent is subject to a terminal disclaimer.

(21) Appl. No.: 09/691,669

(22) Filed: Oct. 18, 2000

(51) Int. Cl.$^7$ ................................................ F02B 75/04
(52) U.S. Cl. ..................................................... 123/48 B
(58) Field of Search ............................. 123/48 B, 48 R (56) References Cited

U.S. PATENT DOCUMENTS

| | | |
|---|---|---|
| 2,134,995 A | 11/1938 | Anderson |
| 4,084,553 A | 4/1978 | Forde et al. |
| 4,241,705 A | 12/1980 | Karaba et al. |
| 4,246,873 A | 1/1981 | Lih-Liaw |
| 4,286,552 A | 9/1981 | Tsutsumi |
| 4,370,901 A | 2/1983 | Bolen |
| 4,934,347 A | 6/1990 | Suga et al. |
| 4,957,069 A * | 9/1990 | Mederer .................... 123/48 B |
| 4,974,554 A * | 12/1990 | Emery ....................... 123/48 B |
| 5,146,879 A * | 9/1992 | Kume et al. ............... 123/48 B |
| 5,417,185 A | 5/1995 | Beattie |
| 5,562,068 A | 10/1996 | Sugimoto et al. |
| 5,724,863 A | 3/1998 | Kramer |
| 5,865,092 A | 2/1999 | Woudwyk |
| 5,960,750 A | 10/1999 | Kreuter |
| 6,223,703 B1 * | 5/2001 | Galvin ...................... 123/48 B |

FOREIGN PATENT DOCUMENTS

JP 03092552 A 4/1991

* cited by examiner

*Primary Examiner*—Noah P. Kamen
*Assistant Examiner*—Jason Benton
(74) *Attorney, Agent, or Firm*—Carlos L. Hanze (57) ABSTRACT

A variable length connecting rod (12) has a first locking mechanism (36) for releasably locking connecting rod parts in a first effective length setting (FIG. 3) for the rod, and a second locking mechanism (38) for releasably locking the connecting rod parts in a second effective length setting (FIG. 2) to change the compression ratio for an engine cylinder. When a length change is to be made, hydraulic fluid unlocks a locked one of the locking mechanisms, allowing inertial force to effect the length change during an engine cycle. At completion of a length change, the other locking mechanism automatically unlocks.

17 Claims, 8 Drawing Sheets

VARIABLE COMPRESSION RATIO CONNECTING ROD LOCKING MECHANISM I

REFERENCE TO RELATED APPLICATIONS AND INCORPORATION BY REFERENCE

This application is related to the following commonly owned patent applications filed of even date and expressly incorporated in their entirety herein by reference: Ser. No. 09/691,668, VARIABLE COMPRESSION RATIO CONNECTING RODS; Ser. No. 09/690,950, VARIABLE COMPRESSION RATIO CONNECTING ROD LOCKING MECHANISM—II; Ser. No. 09/690,951, VARIABLE COMPRESSION RATIO CONNECTING ROD LOCKING MECHANISM—III; Ser. No. 09/691,667, HYDRAULIC CIRCUIT FOR UNLOCKING VARIABLE COMPRESSION RATIO CONNECTING ROD LOCKING MECHANISMS; Ser. No. 09/690,951, HYDRAULIC CIRCUIT HAVING ACCUMULATOR FOR UNLOCKING VARIABLE COMPRESSION RATIO CONNECTING ROD LOCKING MECHANISMS; Ser. No. 09/691,666, APPARATUS FOR VARYING THE COMPRESSION RATIO OF AN INTERNAL COMBUSTION ENGINE; Ser. No. 09/690,691, SYSTEM AND METHOD FOR VARYING THE COMPRESSION RATIO OF AN INTERNAL COMBUSTION ENGINE VARIABLE COMPRESSION RATIO CONNECTING ROD LOCKING MECHANISM; and Ser. No. 09/690,946, PULSE-OPERATED VARIABLE COMPRESSION RATIO CONNECTING ROD LOCKING MECHANISM.

BACKGROUND OF THE INVENTION

This invention relates generally to reciprocating piston type internal combustion (I.C.) engines for motor vehicles. More specifically it relates to I.C. engines having variable compression ratio connecting rods, especially to systems, mechanisms, and strategies for operating a connecting rod to different compression ratios while an engine is running.

BACKGROUND INFORMATION

A gasoline engine whose compression ratio remains invariant as operating conditions change is said to be knock-limited. This means that the compression ratio built into the engine design must be selected to avoid objectionable engine knock that would otherwise occur during certain conditions of engine operation if the compression ratio were larger. However, those conditions that give rise to engine knocking in a motor vehicle typically prevail for only limited times as the vehicle is being driven. At other times, the engine could operate with better efficiency, and still without knocking, if the compression ratio could be made higher, but unfortunately the engine is incapable of achieving more efficient operation during those times because its compression ratio cannot change.

Certain technologies relating to reciprocating piston I.C. engines having variable compression ratio pistons and connecting rods are disclosed in various patents, including U.S. Pat. Nos. 1,875,180; 2,376,214; 4,510,895; 4,687,348; 4,979,427; 5,562,068; and 5,755,192. Various reasons for employing such technologies in I.C. engines have been advanced in those documents. One reason is to improve efficiency by enabling an engine that is relatively more lightly loaded to run at a compression ratio that is higher than a compression ratio at which the engine operates when running relatively more heavily loaded.

The compression ratio of an engine can be varied by varying the overall effective length of a connecting rod and piston. Change in overall effective length may be accomplished in either the connecting rod, or the piston, or in both. The foregoing patents describe various mechanisms for varying overall effective length.

U.S. Pat. No. 5,562,068 discloses a variable compression ratio connecting rod where adjustment of effective length takes place at the large end. Adjustment is performed via an eccentric ring that is generally coincident with a crank pin, but can be selectively locked to the crank pin and to the large end of the rod. When locked to the crank pin, the eccentric ring assumes a position that causes the rod to have a longer effective length and hence a higher compression ratio. When locked to the rod, the eccentric ring assumes a position that causes the rod to have a shorter effective length and hence a lower compression ratio.

The invention disclosed in one of the commonly owned patent applications that is incorporated herein by reference changes the connecting rod effective length at the large end of the connecting rod so that the incorporation of variable compression ratio by length change does not adversely contribute to the reciprocating mass of an engine in a way that might otherwise create unacceptable imbalance. That connecting rod comprises an assembly that contains a first part, a second part, and a third part assembled together to form the large end of the connecting rod assembly and provide a variable length for the connecting rod assembly. The first part is a semi-circular cap. One of the second and third parts is fastened tight to the first part. Guides disposed at opposite sides of the large end operatively relate the other of the second and third parts and the fastened parts to provide for relative sliding motion between the other of the second and third parts and the fastened parts over a limited adjustment range to change the length of the connecting rod assembly. Such a length change mechanism does not employ an eccentric ring as in U.S. Pat. No. 5,562,068.

SUMMARY OF THE INVENTION

The present invention relates to novel systems, mechanisms, and strategies: for operating a connecting rod, especially a connecting rod of the general type disclosed in the above referenced commonly owned patent application, to positions of different length while an engine is running, thereby changing the compression ratio; for locking the connecting rod in one position until it is desired to change length; for unlocking the connecting rod when a length change is desired; for utilizing inertial force to perform the length change; and for locking the connecting rod in another position upon completion of the length change.

The invention utilizes novel mechanical locking mechanisms to lock the connecting rod in its positions of different length. Operation of the locking mechanisms is accomplished by hydraulic pressure, using engine motor oil.

A connecting rod employs two such locking mechanisms. With both locking mechanisms unlocked, the centerline of the large end of a connecting rod is free to move between a position of concentricity relative to the centerline of a crank pin on which it is mounted via a bearing retainer and a position of eccentricity relative to the crank pin centerline.

When a connecting rod is in an extended position that endows it with a longer effective length, a higher compression ratio results. When a connecting rod is in a retracted position that endows it with a shorter effective length, a lower compression ratio results. When a connecting rod is in one of these two positions, one of the two locking mechanisms is locking the connecting rod to the bearing retainer while the other locking mechanism is unlocked.

To change length from an initial length, be that length extended length or retracted length, hydraulic pressure is applied to cause the one locked mechanism to unlock, freeing the connecting rod for re-positioning the centerline of its large end relative to the centerline of the crank pin on which it is mounted. With the connecting rod unlocked from the bearing retainer, inertial force acting on the connecting rod is effective to move it such that the centerline of the large end is re-positioned relative to the centerline of the crank pin, thereby changing the effective length of the connecting rod from the initial length to a new length. Upon completion of the length change, the hydraulic pressure that was effective to unlock the one locking mechanism now becomes effective to lock the other locking mechanism, thereby locking the connecting rod to the bearing retainer in the position of new length. The change in position of the large end centerline relative to the crank pin centerline prevents re-locking of the one locking mechanism that was initially unlocked to initiate the length change, and so that one locking mechanism remains unlocked while the connecting rod is in the new length position.

For changing the effective length from the new length back to the initial length, the application of hydraulic pressure is discontinued, causing the other locking mechanism to unlock and free the connecting rod for re-positioning the large end on the crank pin. With the connecting rod unlocked from the bearing retainer, inertial force acting on the connecting rod is effective to reposition it on the crank pin, thereby restoring the effective length to the initial length. Upon completion of the length change, spring force acting on the lock pin becomes effective to lock the one locking mechanism, thereby locking the connecting rod to the bearing retainer with the connecting rod in the initial length position. The length change prevents the other locking mechanism from being re-locked and so it remains unlocked while the connecting rod is in the initial length position.

One generic aspect of the invention relates to a variable compression ratio engine comprising a connecting rod via which a crankshaft that rotates about a crank axis reciprocates a piston within a cylinder. The connecting rod comprises a first part and a second part that are relatively positionable to set an effective length of the connecting rod and hence a compression ratio for the cylinder. A locking mechanism is selectively operable to a locked condition for locking the first part to the second part in a position that sets a given effective length for the connecting rod and to an unlocked condition that allows the first and second parts to be relatively positioned to an effective length different from the given effective length. The first part comprises a through-hole that has a longitudinal axis parallel to the crank axis and the second part comprises a bore that has a longitudinal axis parallel to the crank axis. The axis of the through-hole is co-axial with the axis of the bore when the connecting rod is set to the given effective length, and the axis of the through-hole is non-co-axial with the axis of the bore when the connecting rod is set to an effective length different from the given effective length. The locking mechanism comprises first and second elements that are operable to a first position representing the locked condition and to a second position representing the unlocked condition of the locking mechanism. With the first and second parts positioned to set the connecting rod to the given effective length and the first and second elements in the first position, each element bridges a respective end of the through-hole and a respective portion of the bore, thereby locking the first and second parts in the given effective length setting. With the first and second elements in the second position, neither element bridges the respective end of the through-hole and the respective end of the bore.

Another aspect relates to a variable length connecting rod for reciprocating a piston within a cylinder of an engine in consequence of rotation of a crankshaft of the engine about a crank axis. The connecting rod comprises a first part and a second part that are relatively positionable to set an effective length of the connecting rod. The first part comprises a first through-hole that has a longitudinal axis parallel to the crank axis and the second part comprises a first bore that has a longitudinal axis parallel to the crank axis. The first part comprises a second through-hole that has a longitudinal axis parallel to the crank axis and the second part comprises a second bore that has a longitudinal axis parallel to the crank axis. The axis of the first through-hole is co-axial with the axis of the first bore when the first and second parts are positioned to set a first effective length for the connecting rod but is non-co-axial with the axis of the first bore when the first and second parts are positioned to set a second effective length for the connecting rod. The axis of the second through-hole is non-co-axial with the axis of the second bore when the first and second parts are positioned to set the first effective length for the connecting rod but is co-axial with the axis of the second bore when the first and second parts are positioned to set the second effective length for the connecting rod. A first locking mechanism acts via the first through-hole and the first bore for releasably locking the two parts in the first effective length setting, and a second locking mechanism acts via the second through-hole and the second bore for releasably locking the two parts in the second effective length setting.

Further aspects will be seen in various features of presently preferred embodiments of the invention that will be described in detail.

BRIEF DESCRIPTION OF THE DRAWINGS

The drawings that will now be briefly described are incorporated herein to illustrate a preferred embodiment of the invention and a best mode presently contemplated for carrying out the invention.

DESCRIPTION OF THE PREFERRED EMBODIMENT(S)

Figure 1:
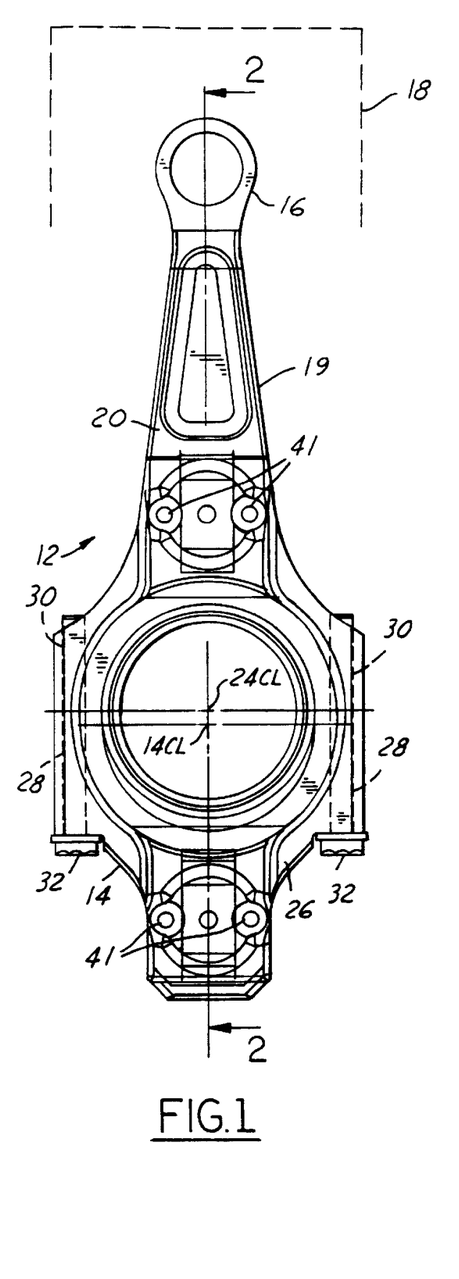
FIG. 1 is an end view of a connecting rod constituting a first exemplary embodiment of the invention, looking along the centerline of the large end, with the connecting rod positioned relative to a bearing retainer to have an effective length that provides a low compression ratio.
Figure 2:
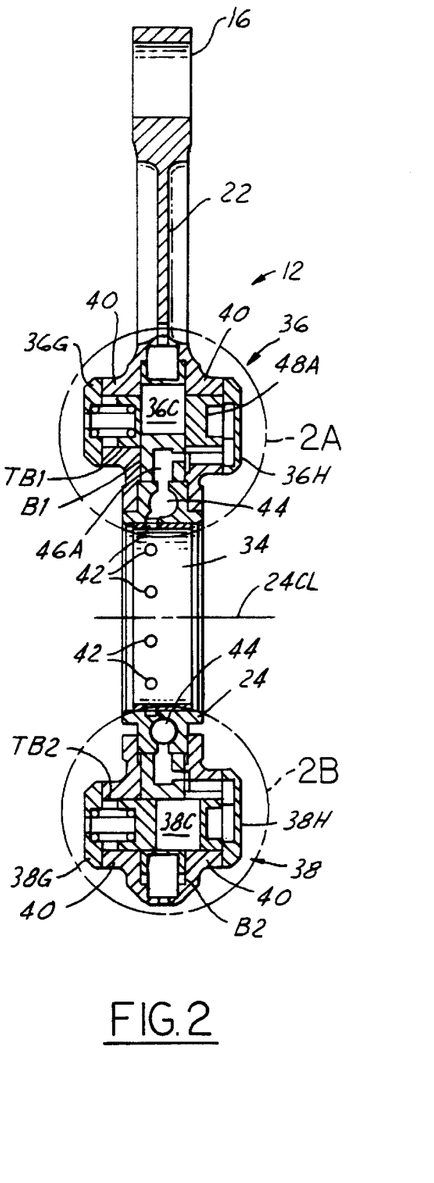
FIG. 2 is a cross section view in the direction of arrows 2—2 in FIG. 1.

FIGS. 1 and 2 show a first embodiment of variable length connecting rod assembly 12 for endowing an engine with a variable compression ratio. Connecting rod assembly 12 comprises a large end 14 for journaling on a crank pin of a crankshaft and a small end 16 for journaling on a central portion of a wrist pin for coupling the connecting rod assembly to a piston 18 (schematically shown in FIG. 1 only). A variable length mechanism is embodied in large end 14 to provide for changing the effective length of connecting rod assembly 12.

Connecting rod assembly 12 comprises a fixed length connecting rod 19 formed by two parts 20 and 26 that are fastened together. One end of part 20 contains small end 16 and a rod portion 22 that extends from the small end to large end 14. The variable length mechanism is like the second embodiment disclosed in the referenced commonly owned patent application and is provided by a bearing retainer 24 which is assembled onto a crank pin of a crankshaft with its centerline concentric with that of the crank pin. Bearing retainer 24 is captured between a somewhat semi-circular portion of part 20 at large end 14 and a somewhat semi-circular cap that forms part 26. Opposite ends of the semi-circumference of part, or cap, 26 contain holes 28 that align with holes 30 in part 20. Fasteners 32 fasten cap 26 to part 20 via holes 28, 30. Cap 26 and part 20 have channels that fit to respective portions of a flange 25 of bearing retainer 24 (see FIG. 2C).

The channel and flange depths are chosen to allow fixed length connecting rod 19 to move a short distance on bearing retainer 24, thereby changing the effective length of connecting rod assembly 12 by re-positioning the centerline 14CL of large end 14 relative to the centerline 24CL of bearing retainer 24. The channels form the groove and the flange forms the tongue of a tongue-and groove type joint providing for sliding motion that adjusts the effective length of the connecting rod assembly as measured between the centerline 16CL of small end 16 and the centerline 24 CL of bearing retainer 24.

Figure 2A:
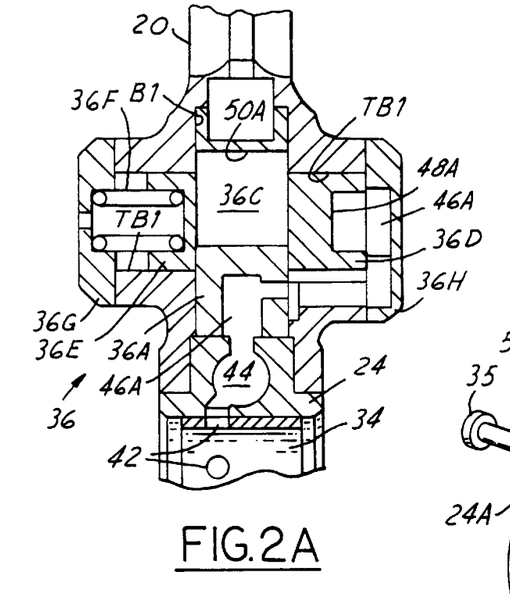
FIG. 2A is an enlarged view in oval 2A of FIG. 2.
Figure 2B:
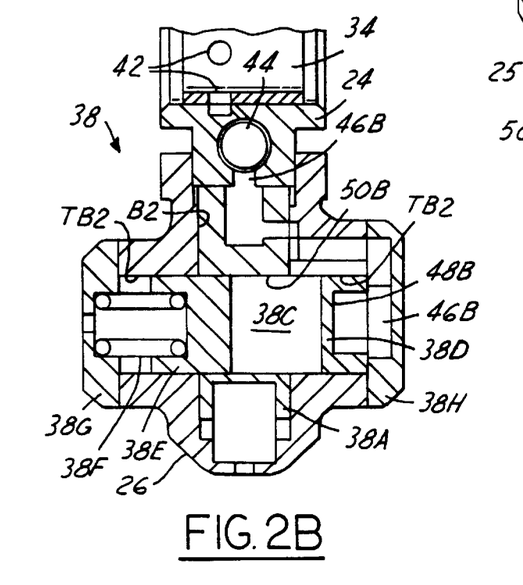
FIG. 2B is an enlarged view in oval 2B of FIG. 2.
Figure 2C:
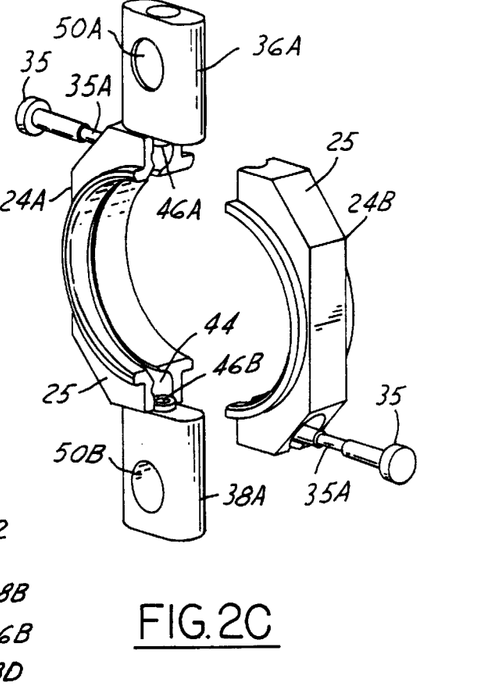
FIG. 2C is an exploded perspective view of a bearing retainer by itself, apart from the views of FIGS. 1 and 2.

A bearing 34 resides within bearing retainer 24 to function as a bearing surface between the inside diameter (I.D.) of the bearing retainer and the outside diameter (O.D.) of the crank pin (not shown in FIGS. 1 and 2) girdled by the bearing retainer, as the bearing retainer turns on the crank pin in response to crankshaft rotation. FIG. 2C shows bearing retainer 24 to comprise split halves 24A, 24B that are held fast together by fasteners 35 when the bearing retainer is assembled to the crank pin. Bearing retainer 24 and fasteners 35 will be described in more detail later.

Connecting rod 12 comprises two locking mechanisms 36, 38. One locking mechanism 36 is disposed at large end 14 between small end 16 and centerline 14CL, and the other 38 is disposed at large end 14 diametrically opposite the first relative to centerline 14CL. The two mechanisms are quite similar. Enlarged detail of the two locking mechanisms appears in FIGS. 2A and 2B.

Locking mechanism 36 comprises several parts including a post 36A, a lock pin 36C, a piston 36D, a lock pin stop 36E, a lock pin stop spring 36F, a spring cover 36G, and an oil cover 36H.

Locking mechanism 38 comprises several parts including a post 38A, a lock pin 38C, a piston 38D, a lock pin stop 38E, a lock pin stop spring 38F, a spring cover 38G, and an oil cover 38H.

Each post 36A, 38A is fastened to bearing retainer 24 in any suitable manner such that the posts are disposed on the longitudinal centerline of connecting rod assembly 12 to project in opposite directions from opposite sides of bearing retainer 24, as perhaps best shown by FIG. 2C. Post 36A is received within a suitably shaped bore B1 in part 20, and post 38A within a suitably shaped bore B2 in cap 26. The bores allow the posts to move within them whenever the effective length of connecting rod assembly 12 changes, and like flange 25 may provide guidance for the longitudinal motion of connecting rod 19 on bearing retainer 24 when the effective length of connecting rod assembly 12 changes.

At the location of a respective locking mechanism, each part 20 and 26 comprises a respective pair of bosses 40 on opposite faces of connecting rod 19. A respective through-bore TB1, TB2 extends through connecting rod 19 between each pair of bosses 40 parallel to centerline 24CL and intersects the respective bore B1, B2 within which the respective post 36A, 38A is disposed.

Spring covers 36G, 38G are secured, in any suitable manner, such as by fasteners 41, to parts 20 and 26 respectively against the respective boss 40 on the same face of connecting rod 19 to close the corresponding end of the respective through-bore TB1, TB2. Oil covers 36H, 38H are secured, in any suitable manner, such as by fasteners 41, to parts 20 and 26 respectively against the respective boss 40 on the same face of connecting rod 19, but opposite the face containing spring covers 36G, 38G, to close the corresponding end of the respective through-bore TB1, TB2 opposite the end closed by the respective spring cover.

Lock pin stop springs 36F, 38F bear against the interior face of the respective spring cover 36G, 38G to resiliently urge the respective lock pin stop 36E, 38E within the respective through-bore TB1, TB2 toward the respective post 36A, 38A.

Bearing 34 contains a series of through-holes 42 that are open to a circumferentially continuous channel 44 in bearing retainer 24. A respective control passage 46A, 46B extends from channel 44 to the end of the respective through-bore TB1, TB2 that is closed by the respective oil cover 36H, 38H.

Control passage 46A begins in post 36A where it is open to channel 44. In this regard, FIG. 2C shows the shank of the proximate fastener 35 has a reduced cross section 35A where it passes across the control passage entrance. Moreover, the nominal cross section of the fastener shank is dimensioned in relation to channel 44 so as not to obstruct oil flow through the channel approaching the control passage. Control passage 46A continues in part 20, transitioning from post 36A to part 20 at a portion of the interface between the O.D. of the post and the wall of bore B1 within which the post is disposed. Passage 46A continues in oil cover 36H, transitions from part 20 to oil cover 36H at a portion of boss 40 covered by oil cover 36H. The interior face of oil cover 36H defines a shape for the end of control passage 46A leading to a blind hole 48A in the confronting end face of piston 36D.

Control passage 46B begins in post 38A where it is open to channel 44. In this regard, the shank of the proximate fastener 35 has a reduced cross section 35A where it passes across the control passage entrance. Moreover, the nominal cross section of the fastener shank is dimensioned in relation to channel 44 so as not to obstruct oil flow through the channel approaching the control passage. Control passage 46B continues in cap 26, transitioning from post 38A to cap 26 at a portion of the interface between the O.D. of the post and the wall of bore B2 that guides the post. Passage 46B continues in oil cover 38H, transitioning from cap 26 to oil cover 38H at a portion of boss 40 covered by oil cover 38H. The interior face of oil cover 38H defines a shape for the end of control passage 46B leading to a blind hole 48B in the confronting end face of piston 38D. The formations that form the control passages in the various individual parts have geometries that maintain each passage open for all positions of post 36A, 38A relative to bores B1, B2.

FIGS. 1 and 2 depict connecting rod assembly 12 in a retracted position that provides a low compression ratio. FIG. 1 shows that centerline 14CL is beyond centerline 24 relative to centerline 16CL. As will be explained, hydraulic pressure must be applied to control passages 46A, 46B to operate connecting rod 12 to an extended position that provides a high compression ratio. In a motor vehicle that is powered by an engine having variable compression ratio connecting rods, it may be desirable to have either the extended position or the retracted position be a default position, meaning a position to which all connecting rods will operate in the event of a default. What constitutes a default may be defined in various ways depending on various considerations in vehicle operation. For the embodiment of FIGS. 1 and 2 shown here, the low compression ratio position is the default position.

In the retracted position of FIGS. 1 and 2, locking mechanism 38 is locked, locking cap 26 to post 38A, and hence to bearing retainer 24. Locking is accomplished by a through-hole 50B in post 38A that aligns with through-bore TB2. Lock pin stop spring 38F is urging lock pin stop 38E into abutment with lock pin 38C, the latter into abutment with piston 38D, and the latter against oil cover 38H. The succession of abutted elements 38E, 38C, 38D assume a condition where lock pin stop 38E enters one end of through-hole 50B from one end of through-bore TB2 and lock pin 38C enters the opposite end of through-bore TB2 from the opposite end of through-hole 50B.

In the retracted position of FIGS. 1 and 2, locking mechanism 36 is unlocked. Post 36A comprises a through-hole 50A that is out of alignment with through-bore TB1. Lock pin 36C has an axial dimension that allows it to fit within through-hole 50A without protruding from either end. Lock pin stop 36E is in a retracted condition clear of bore B1 to one side of post 36A, compressing spring 36F in the process. Piston 36D is clear of bore B1 to the opposite side of post 36A.

When hydraulic fluid is forced under pressure through through-holes 42 and channel 44, the fluid ultimately acts on both pistons 36D, 38D. The fluid has no effect on the former piston because that piston is prevented from moving due to the partial obstruction of through-bore TB1 by post 36A. The fluid does have an effect on the latter piston because no corresponding obstruction is present. Hence, the abutted elements 38D, 38C, and 38E are displaced to the left in FIG. 2, increasingly compressing spring 38F in the process, until lock pin stop 38E abuts cover 38G in which event the lock is released due to lock pin stop 38E having been displaced out of through-hole 50B and lock pin 38C having been lodged entirely within through-hole 50B, without piston 38D being sufficiently displaced to protrude into through-hole 50B.

Figure 3:
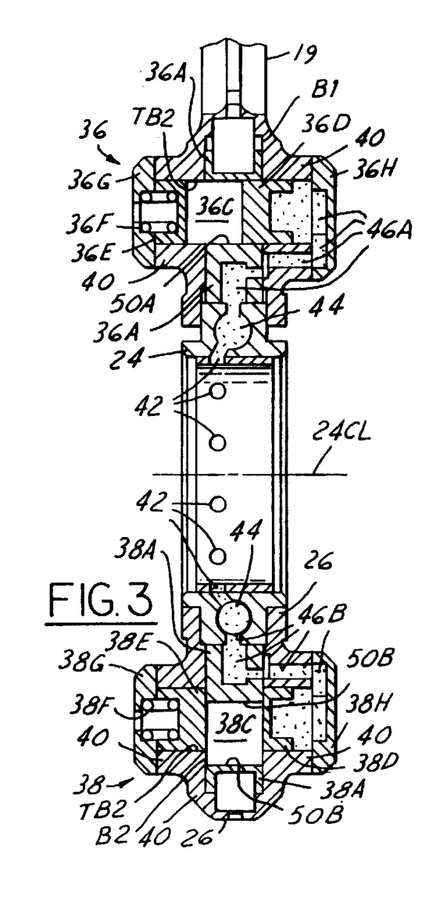
FIG. 3 is a view like FIG. 2, but with the connecting rod re-positioned on the bearing retainer to an effective length that provides a high compression ratio.

With both locking mechanisms now unlocked, crankshaft rotation is effective to impart an inertial force to connecting rod 19 for causing it to move to extended position represented by FIG. 3. When connecting rod 19 attains extended position on bearing retainer 24, through-hole 50A attains alignment with through-bore TB1, while through-hole 50B has moved out of alignment with through-bore TB2, carrying lock pin 38C with it within through-hole 50B. Hence, locking mechanism 36 is now locked while mechanism 38 remains unlocked.

From the foregoing description, several aspects of operation may be recognized. A first aspect is that the locking of one mechanism is sufficient to lock the connecting rod assembly in one of two possible lengths. A second aspect is that it is not possible for both locking mechanisms to be locked at the same time. A third aspect is that a length change is initiated by unlocking a locked mechanism so that both locking mechanisms are unlocked. A fourth aspect is that one of the mechanisms will automatically lock the connecting rod assembly upon completion of a length change.

Figure 4:
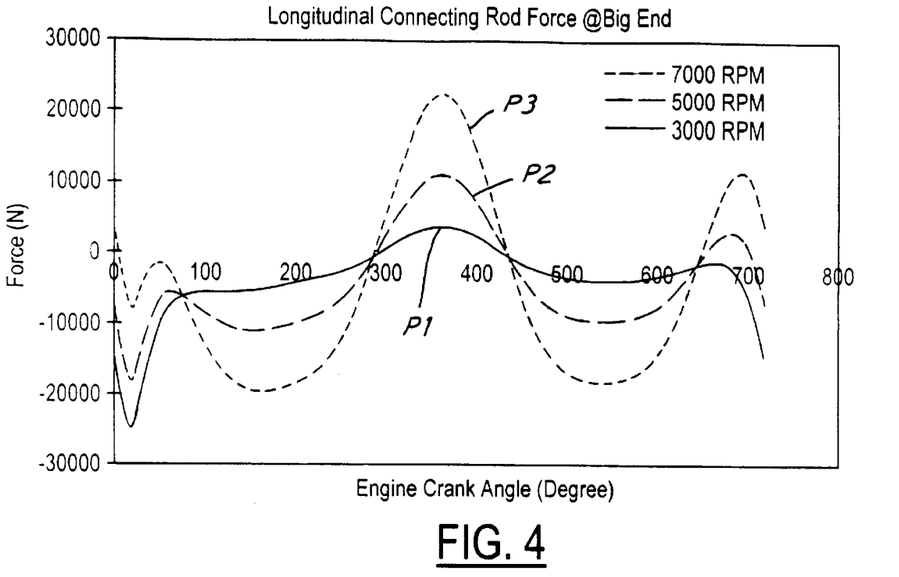
FIG. 4 is a graph plot useful in explaining how the forces acting on a locking mechanism of a connecting rod change as a function of engine speed.

FIG. 4 is a graph in which engine crankshaft rotation, as measured angularly in degrees about the crankshaft axis, appears along the horizontal axis of the graph and the longitudinal component of inertial force acting along the connecting rod axis at the large end is measured in newtons along the vertical axis of the graph. FIG. 4 contains three representative graph plots, P1, P2, P3, each of which relates the longitudinal force component to crank angle for a respective engine speed of 3000 rpm, 5000 rpm, and 7000 rpm.

Crankshaft rotation imparts inertia to the crank pin on which the connecting rod assembly is mounted, and inertial force is in turn imparted to the connecting rod assembly. Although the inertial force is used to change the effective length of the connecting rod assembly when both locking mechanisms are unlocked, it also imposes side loads on the movable parts of the locking mechanisms, and those side loads can vary over the course of an engine cycle. During portions of an engine cycle when inertial force is relatively small in magnitude, the side loads acting on the locking mechanisms are sufficiently small that a locked mechanism will unlock when hydraulic fluid is forced into the connecting rod assembly, as previously described, and the unlocked mechanism will lock after the length change has occurred. At times in an engine cycle, inertial force may be sufficiently large in magnitude that the resulting side loads acting on the locking mechanisms become large enough to prevent a locked mechanism from unlocking and an unlocked mechanism from locking.

FIG. 4 shows that a relatively larger positive force component is reliably developed within a substantial enough range in the vicinity of top dead center (360°) in the exhaust stroke to assure extension of the effective length of the connecting rod once both locking mechanisms have been unlocked. FIG. 4 also shows the reliable development of a relatively larger negative force component within a substantial enough range in the vicinity of bottom dead center (540°) in an ensuing intake stroke, and it is that force component that is effective to contract the connecting rod assembly provided that both locking mechanisms have been unlocked.

When it is appropriate to extend the length, hydraulic pressure is applied in advance of top dead center of the exhaust stroke to unlock locking mechanism 38. With locking mechanism 36 already unlocked, the rise in positive inertial force is effective to extend the effective length of the connecting rod assembly. The alignment that through-bore TB1 attains with through-hole 50A at full length extension places both piston 36D and lock pin stop 36E in alignment with lock pin 36C, and because hydraulic pressure continues to be applied, the hydraulic force acting on piston 36D forces it to enter one end of through-hole 50A and push lock pin 36C, and in turn lock pin stop 36E, increasingly compressing spring 36F. The three abutted elements 36D, 36C, 36E are displaced until the latter one 36E abuts spring cover 36G to arrest the displacement of all three. With the displacement having been stopped, piston 36D is straddling through-bore TB1 and through-hole 50A to one side of post 36A while lock pin 36C is straddling through-bore TB1 and through-hole 50A to the other side of post 36A, thereby placing locking mechanism 36 in locked condition that locks the connecting rod assembly in the extended position. The application of hydraulic pressure is maintained in order to keep locking mechanism 36 locked and assure that the connecting rod assembly remains extended in the high compression ratio position. Because of side loading caused by the inertial force, actual locking of mechanism 36 may not occur until the inertial force that was effective to change the length subsides in magnitude.

In order to operate the connecting rod assembly to the low compression ratio position, the application of hydraulic pressure is terminated sufficiently in advance of an appropriate point in the engine cycle where the inertial force acting on the connecting rod assembly will be effective to create the requisite negative force for moving connecting rod 19 to retracted position on bearing retainer 24. When hydraulic pressure ceases to be applied and the side load on locking mechanism 36 does not prevent it from unlocking, spring 36F is effective to displace the three abutted elements 36E, 36C, and 36D toward oil cover 36H. Displacement of these three elements is arrested by abutment of piston 36D with oil cover 36H. When that happens, lock pin 36C is disposed wholly within through-hole 50A while neither lock pin stop 36E nor piston 36D is protruding into through-hole 50A. As inertial force acting on the connecting rod assembly becomes increasingly negative, connecting rod 19 retracts to the low compression ratio position on bearing retainer 24.

Upon connecting rod 19 reaching the retracted position of FIG. 2, through-bore TB2 aligns with through-hole 50B. Provided that the side load on locking mechanism 38 is sufficiently small not to prevent it from locking, the compression force in spring 38F is effective on the succession of abutted elements 38E, 38C, 38D to displace them until the latter element 38D abuts oil cover 38H stopping the displacement. With the displacement arrested, lock pin stop 38E is straddling through-bore TB2 and through-hole 50B to one side of post 38A while lock pin 38C is straddling through-hole 50B and through-bore TB2 to the opposite side of post 38A, thereby placing locking mechanism 38 in a condition that locks the connecting rod in the low compression ratio position. Because of inertial force changes, actual locking of mechanism 38 may not actually occur until the inertial force that was effective to change the length subsides in magnitude. The connecting rod remains in this position until hydraulic pressure is once again applied to operate it to the high compression ratio position in the manner described earlier.

Figure 5:
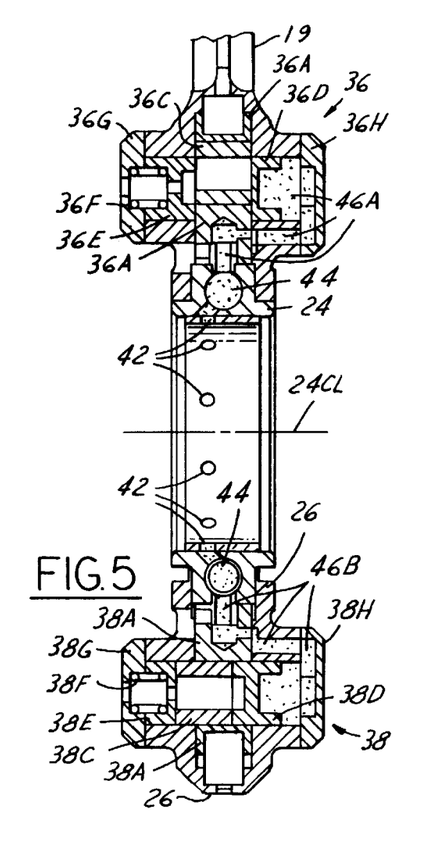
FIG. 5 is a view similar to FIG. 2, but showing an exemplary second embodiment with the connecting rod positioned on the bearing retainer to an effective length that provides a low compression ratio.
Figure 6:
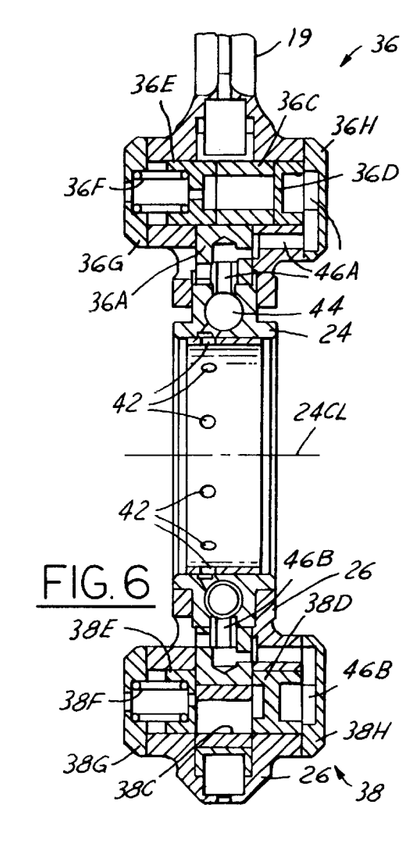
FIG. 6 is a view like FIG. 5, but showing the second embodiment with the connecting rod positioned on the bearing retainer to an effective length that provides a high compression ratio.

The second embodiment that appears in FIGS. 5 and 6 uses the same reference numerals used in FIGS. 1, 2, and 3 to identify corresponding elements; hence, a detailed description is believed unnecessary except to the extent of explaining certain differences between corresponding elements in the respective embodiments.

A principal difference between the two embodiments is that the second embodiment utilizes the high compression ratio position of FIG. 6 as the default position. This is accomplished by using locking mechanism 36 to lock connecting rod 19 in extended position relative to bearing retainer 24 when hydraulic fluid pressure is not being applied to the connecting rod. FIG. 6 shows that lock pin stop 36E is straddling through-bore TB1 and through-hole 50A to one side of post 36A while piston 36D is straddling the through-bore and the through-hole at the opposite side of post 36A. As can be understood on the basis of previous description of the first embodiment, FIG. 6 shows locking mechanism 38 to be unlocked while the connecting rod is in the high compression ratio default position.

The application of hydraulic pressure unlocks locking mechanism 36, and because locking mechanism 38 is already unlocked, the occurrence of suitable inertial force is effective to retract the connecting rod from the high compression ratio position of FIG. 6 to the low compression position of FIG. 5. When connecting rod 19 assumes the retracted position, the continuing application of hydraulic pressure is effective on piston 38D to cause the abutted three elements 38D, 38C, and 38E to be displaced and assume the position shown in FIG. 5. From previous description of the first embodiment, it can be understood that this position represents the locked condition of locking mechanism 38. The connecting rod will remain locked in the low compression ratio position until hydraulic pressure is removed.

When that occurs, compressed spring 38F is able to displace the three abutted elements 38E, 38C, 38D to a position that unlocks locking mechanism 38. Because locking mechanism 36 has remained unlocked, the two now unlocked mechanisms allow connecting rod 19 to extend on bearing retainer 24 when a point in the engine cycle provides suitable inertial force to do so. When the connecting rod returns to the extended position of FIG. 6, through-bore TB1 again, aligns with through-hole 50A, and from previous description it can be understood that locking mechanism 36 immediately once again locks thereby locking the connecting rod in the high compression ratio position.

In a general way, the second embodiment may be viewed as like the first except to the extent of constructing locking mechanism 36 of the second embodiment to be like locking mechanism 38 of the first embodiment and locking mechanism 38 of the second embodiment to be like locking mechanism 36 of the first embodiment. Further constructional differences between certain of the individual elements of the second embodiment and their counterparts in the first embodiment are also present. Both lock pins in the second embodiment are tubular cylinders, rather than the solid cylinders of the first embodiment. Piston 38D of the second embodiment has a blind hole in its end that faces lock pin 38C whereas piston 36D of the first embodiment has none. Lock pin stop 36E of the second embodiment has a shouldered hole in its end that faces lock pin 36C and that shouldered hole is open to the hole in the opposite end whereas lock stop pin 38E of the first embodiment has no such shouldered hole. Hence elements 36C, 38C, 38D, and 36E have less inertial mass in the second embodiment, and that is beneficial in reducing the amount of time required to lock and unlock the locking mechanisms. While control passages 46A, 46B have the same general shapes, their geometries are slightly different in the respective embodiments.

Figure 7:
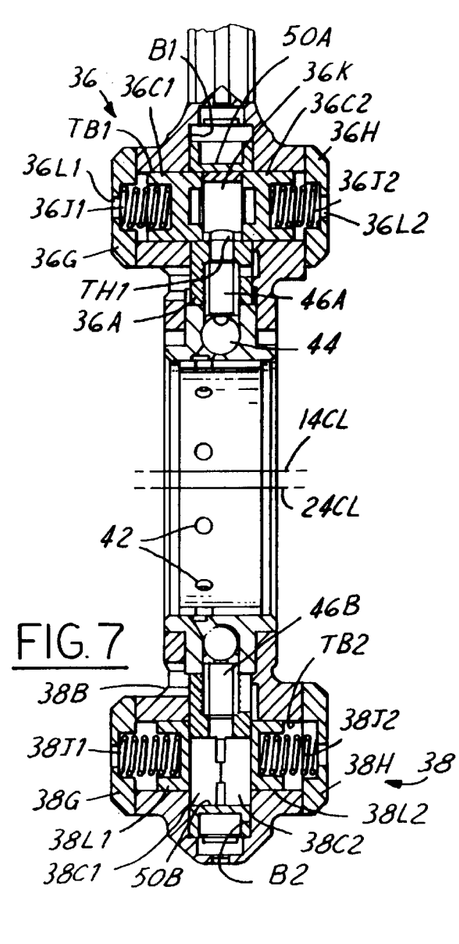
FIG. 7 is a view similar to FIG. 2, but showing an exemplary third embodiment with the connecting rod positioned on the bearing retainer to an effective length that provides a high compression ratio.
Figure 7A:
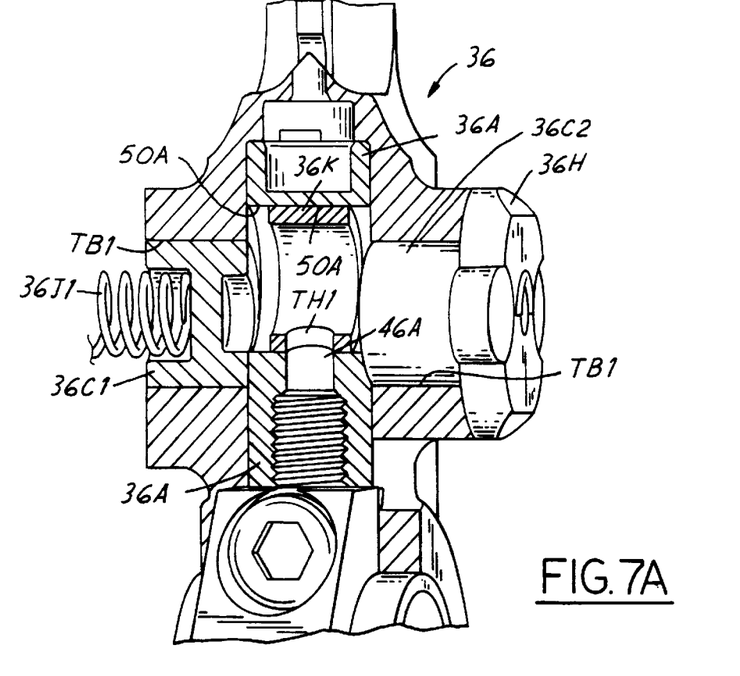
FIG. 7A is an enlarged fragmentary perspective view of a locking mechanism shown in FIG. 7, but in a different locking condition from that shown in FIG. 7.

The third embodiment shown in FIG. 7 and 7A possesses locking mechanisms 36, 38 that are somewhat different from those of the first two embodiments. Elements of the third embodiment that are similar to those of the first two embodiments are identified by the same corresponding reference numerals, and it is believed that detailed descriptions are unnecessary, except for relevant differences.

FIG. 7 shows the connecting rod in the high compression ratio default position where locking mechanism 36 is locked while locking mechanism 38 is unlocked. Locking mechanism 36 comprises two lock pins 36C1, 36C2. A respective spring 36J1, 36J2 is associated with a respective lock pin. A cylindrical spacer sleeve 36K is disposed in through-hole 50A. Control passage 46A is open within part 20 to through-hole 50A, and sleeve 36K contains a through-hole TH1 that allows the control passage to be open to the interior of the spacer sleeve, and hence also the interior of through-hole 50A.

Each lock pin comprises blind holes in its opposite end faces. One end of spring 36J1 seats in a seat provided in the interior face of cover 36G, and the opposite end of the spring seats in the confronting blind hole of lock pin 36C1. One end of spring 36J2 seats in a seat provided in the interior face of cover 36H, while the opposite end seats in the confronting blind hole of lock pin 36C2. The two springs bias the respective lock pins toward each other and against opposite ends of the intervening spacer sleeve 36K. With the lock pins abutting the sleeve, each lock pin straddles through-hole SOA and through-bore TB1 to a respective side of post 36A.

Locking mechanism 36 is unlocked by forcing hydraulic fluid through control passage 46A into the space that is circumscribed by sleeve 36K. Pressure of the hydraulic fluid forces lock pins 36C1, 36C2 apart until they are stopped by abutment with the respective covers 36G, 36H. When that occurs, each lock pin has been sufficiently displaced to clear through-hole 50A thereby unlocking locking mechanism 36.

Locking mechanism 38 comprises two stops 38L1, 38L2. A respective spring 38J1, 38J2 is associated with a respective stop. FIG. 7 shows the unlocked condition where each stop is retracted clear of post 38B with through-bore TB2 out of alignment with through-hole 50B. Locking mechanism 38 further comprises two lock pins 38C1, 38C2. With locking mechanism 38 in the unlocked condition shown in FIG. 7, both lock pins are disposed entirely within through through-hole 50B. Control passage 46B is open within part 26 to through-hole 50B. At their confronting faces the two lock pins have reliefs providing surface area against which hydraulic fluid from control passage 46B can act to spread the lock pins apart and thereby lock mechanism 38 when through-hole 50B aligns with through-bore TB2.

To operate the connecting rod from the high compression position shown in FIG. 7 to the low compression position, which is shown in FIG. 7A for locking mechanism 36 only, hydraulic fluid pressure is applied. This spreads lock pins 36C1, 36C2 apart unlocking locking mechanism 36. Relief holes 36L1 and 36L2 are present in covers 36G and 36H. Inertial force acting on the connecting rod can thereby be effective at a certain point in the engine operating cycle to cause the fastened parts 20, 26 to move relative to bearing retainer 24 to the retracted low compression ratio.

When the connecting rod reaches its retracted position, the continued application of hydraulic pressure is effective to spread lock pins 38C1, 38C2 apart so that each protrudes from a respective side of post 38A to straddle through-hole 50B and through-bore TB2. As the two locking pins are spreading apart they are similarly displacing stops 38L1, 38L2, compressing the respective springs 38J1, 38J2 in the process. The spreading is limited by abutment of the respective stops with the respective covers 38G, 38H at which time the lock pins are locking the connecting rod to post 38A and hence to bearing retainer 24.

This condition ensues until the application of hydraulic pressure ceases. At that time springs 38J1, 38J2, acting through stops 38L1, 38L2 force lock pins 38C1, 38C2 back into through-hole 50B, unlocking locking mechanism 38 at the appropriate time in the engine cycle to allow inertial force to return the connecting rod to the default position. Once the connecting rod has extended, springs 36J1, 36J2 are effective to force lock pins 36C1, 36C2 into through-hole 50A and against sleeve 36K thereby placing locking mechanism 36 in locked condition to lock the connecting rod in the high compression ratio default position.

A hydraulic control system for operating the locking mechanisms of any of the various connecting rods that have been described may take advantage of an existing engine oil pump and existing engine oil passages, including oil passages in the engine crankshaft. FIGS. 8, and 8A–8E show a crankshaft 60 having four main bearing journals 62A, 62B, 62C, and 62D and three connecting rod journals, or crank pins, 64A, 64B, and 64C. Certain existing oil passages 66 convey pumped engine motor oil from main bearings 62 and through crankshaft 60 to crank pins 64. If those existing passages 66 are not sized to deliver oil in sufficient volume and/or at suitable pressure both for lubrication and for quickly and reliably operating the locking mechanisms, it may be appropriate to create additional new passages such that one or more of the crank pins 64 is served by two oil passages, each of which comes from a different main bearing 62.

FIGS. 8A–8D show an example of four engine mountings 62A2, 62B2, 62C2, and 62D2 for main bearing journals 62A, 62B. 62C, and 62D respectively. The two inner mountings 62B2 and 62C2 have two oil channel grooves 62B1, 62B3 and 62C1, 62C3. The two outer mountings 62A2 and 62D2 have one oil channel groove 62A1 and 62D1. Engine motor oil that is pumped by the engine oil pump to all main bearings is delivered to all six grooves. Crankshaft 60 is provided with additional passages 66 such that each of the three connecting rod assemblies on the respective crank pins 64A, 64B, and 64C receives oil through two different main bearings. One of the passages that serves each connecting rod assembly is a lubricant passage L and the other passage serving each connecting rod assembly is a boost passage B.

Figure 8:
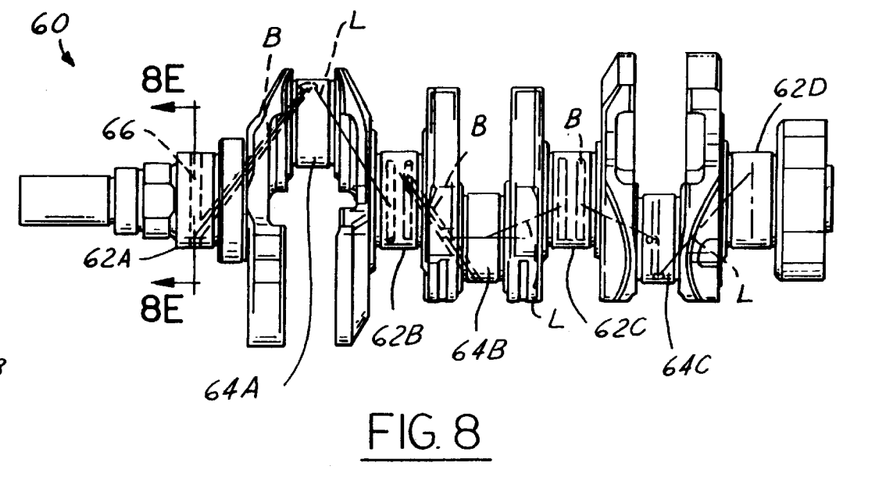
FIG. 8 is a longitudinal view of an exemplary crankshaft (by itself) on which the connecting rods are mounted.
Figures 8A, 8B, 8C, 8D:
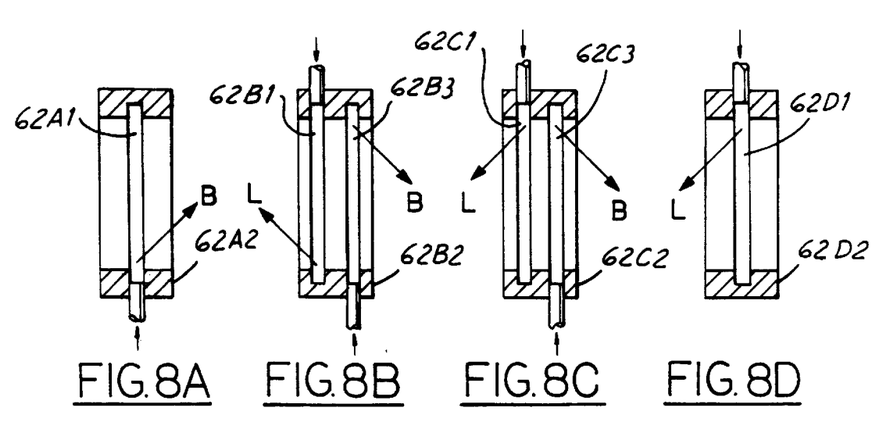
FIG. 8A depicts an engine block mounting for a first of the main bearing journals of the crankshaft of FIG. 8.
FIG. 8B depicts an engine block mounting for a second of the main bearing journals of the crankshaft of FIG. 8.
FIG. 8C depicts an engine block mounting for a third of the main bearing journals of the crankshaft of FIG. 8.
FIG. 8D depicts an engine block mounting for a fourth of the main bearing journals of the crankshaft of FIG. 8.
Figure 8E:
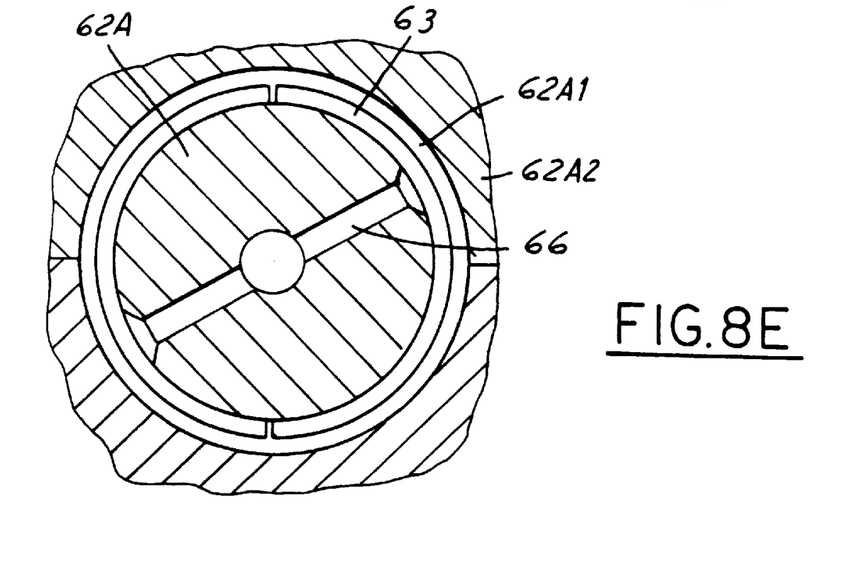
FIG. 8E is an enlarged transverse cross section view in the direction of arrows 8E—8E in FIG. 8 showing more detail.

FIG. 8E is a representative view showing the relationship of one main bearing journal 62A and the corresponding engine mounting 62A2. A bearing 63 lines the inside of the mounting surrounding the bearing journal. The portion of the bearing that covers groove 62A1 contains a circumferential series of through-holes through which oil in the groove can pass to passage 66 as the journal revolves within the bearing. The through-holes are arranged to maintain bearing integrity, yet provide continuous communication of at least one of the flared entrances at opposite ends of passage 66 with groove 62A1 as the journal revolves within the bearing. In this way, oil can be delivered to the connecting rod in sufficient quantity throughout the engine cycle.

Figure 9A:
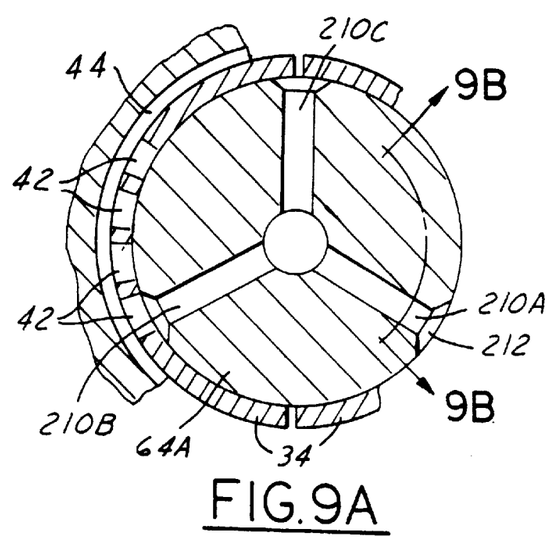
FIG. 9A is a transverse cross section view through a crank pin of the crankshaft on which a connecting rod is mounted.
Figure 9B:
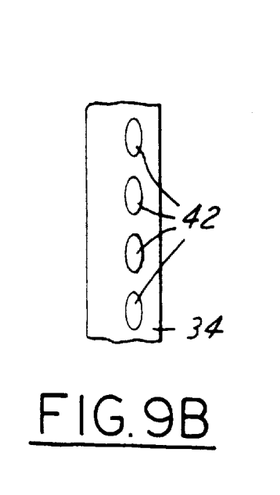
FIG. 9B is a cross section view in the direction of arrows 9B—9B in FIG. 9A.

FIG. 9A is a representative view showing the relationship between crank pin 64A and the connecting rod mounted on it. The same reference numerals used in previous Figures appear in FIG. 9, as well as the related FIG. 9B, to designated the same parts as before. At anytime in the engine cycle, oil that is delivered through the crankshaft to the crank pin can pass from the crank pin to the connecting rod via one or more of three radial passages 210A, 210B, 210C arranged symmetrically in the crank pin about the crank pin axis. The end of each passage that confronts bearing 34 comprises a flare 212.

The two semi-circular halves of bearing 34 are essentially symmetrical. Each comprises a series of through-holes 42 within a limited circumferential span that is centrally disposed relative to opposite circumferential ends of each bearing half. The portions of each bearing half extending circumferentially from the first and last through-holes to opposite ends of the half are imperforate. FIG. 9A shows a condition where the crank pin is revolving in the clockwise direction, and passage 210B has just entered the span of through-holes 42 in left-hand bearing half.

As the crank pin continues to revolve, the flared end of passage 210B passes in succession across the through-holes. The through-holes and the flared end of the passage are arranged such that continuous communication of the passage to channel 44 is maintained as the crank pin revolves. Just before passage 210B leaves the last through-hole of the left-hand set, passage 210A is entering the span of through-holes in the right-hand bearing half. This assures continuity of communication of oil to channel 44. From this description of one transition from one passage to another, one can therefore appreciate that the illustrated arrangement assures no interruption in continuity of communication as the crank pin revolves within the connecting rod. The arrangement is also advantageous because the bearing, except for any gap between confronting ends of opposite halves, is imperforate in those regions that react longitudinal force components in the connecting rod. It is believed that this is beneficial in minimizing stress levels in the bearing caused by forces applied through it.

Figure 10:
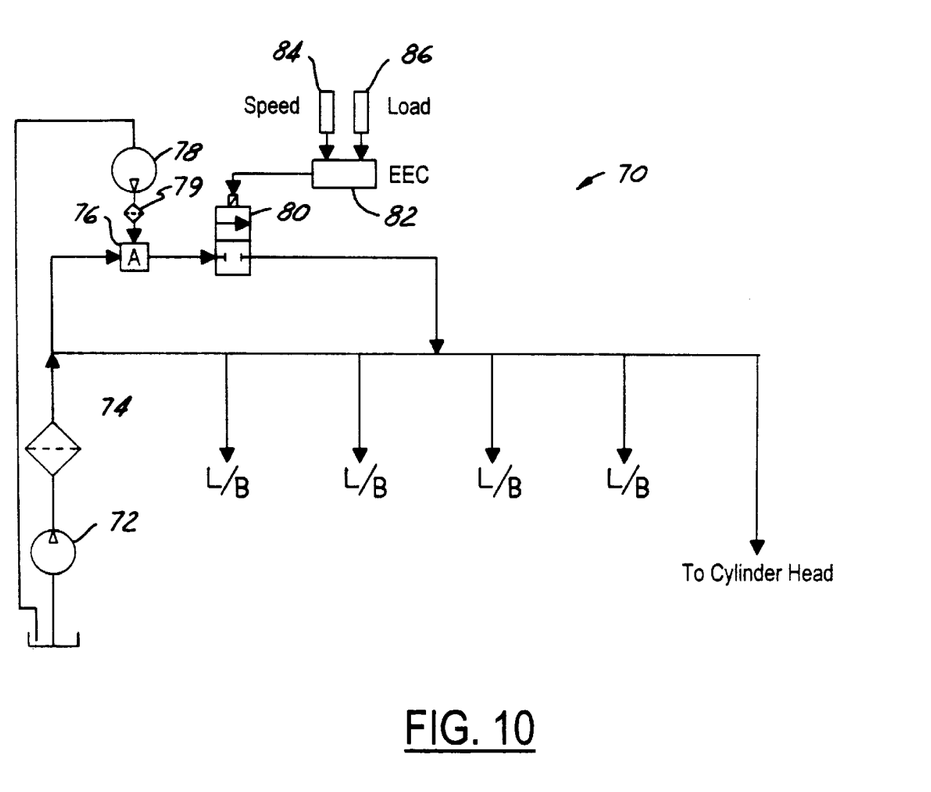
FIG. 10 is a schematic diagram of a first exemplary embodiment of a hydraulic control for changing the effective lengths of connecting rods on a crankshaft.

FIG. 10 shows an exemplary hydraulic control system 70 associated with a crankshaft and variable compression ratio connecting rods having locking mechanisms like any of the embodiments described above. The crankshaft, like crankshaft 60, may have three connecting rods, but unlike crankshaft 60, it may not have separate lubricant and boost passages serving each crank pin.

Control system 70 functions to control the locking and unlocking of the locking mechanisms via oil passages that also provide lubrication to the respective main bearings. An existing engine oil pump 72 draws engine motor oil from a sump, such as an engine oil pan, and pumps it through a filter 74 to internal passages of the engine, including pumping oil to corresponding channels 44 in bearing retainers 24.

Additional hydraulic devices in control system 70 include an accumulator 76, a boost pump 78, a filter 79, and a flow selector valve 80. Valve 80 may be solenoid-actuated and under the control of an electronic engine controller (EEC) 82 that processes various inputs including engine speed 84 and engine load 86. Accumulator 76 accumulates engine motor oil as hydraulic fluid, with pump 78 imparting a pressure boost to the accumulated fluid. When valve 80 is closed, as shown by FIG. 10, accumulator 76 cannot deliver fluid. The output of pump 72 is by itself insufficient to change the existing state of any locking mechanism of a connecting rod assembly.

When the state of a locking mechanism is to be changed for making a change in connecting rod length, EEC 82 operates valve 80 from closed to open, causing hydraulic fluid to be applied at an increased pressure in sufficient volume to unlock a locked mechanism in each connecting rod. This allows all connecting rods to change from one compression ratio to the other, with each connecting rod changing effective length in relation to the engine cycle occurring in the corresponding engine cylinder as described above. Hence, the connecting rods change length sequentially rather than simultaneously. The increased pressure is continually applied to the crankshaft to keep the connecting rods in the compression ratio to which they have been changed.

Restoration of the connecting rods to the original compression ratio position is accomplished by terminating the application of increased pressure to the crankshaft. This is done by operating valve 80 closed in response to a corresponding command from EEC 82. The reduction in hydraulic pressure unlocks the locked locking mechanism in each of the connecting rods, thereby placing both locking mechanisms of each connecting rod in unlocked states. An ensuing inertial force of sufficient magnitude and proper direction acts to restore each connecting rod to its original compression ratio position where the locking mechanism that had remained unlocked while the connecting rod was in the other compression ratio position now locks the connecting rod in the original compression ratio position.

Figure 11:
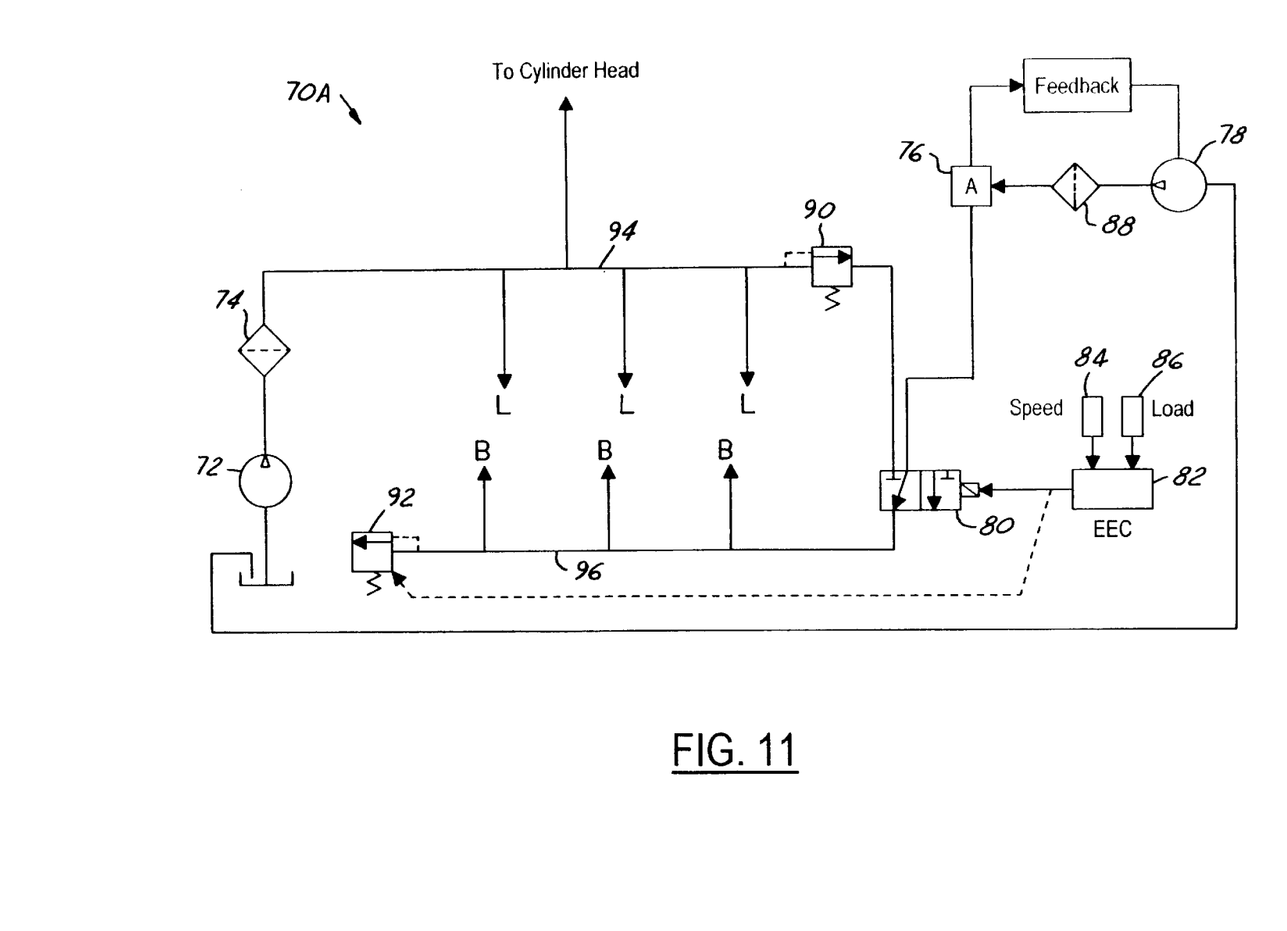
FIG. 11 is a schematic diagram of a second exemplary embodiment of a hydraulic control for changing the effective lengths of connecting rods on a crankshaft.

FIG. 11 illustrates another hydraulic control system 70A that utilizes a number of the same hydraulic components as system 70, and those components are identified by the same reference numerals in both Figures. Control system 70A comprises additional components that include two pressure relief valves 90, 92. The crankshaft and main bearings are like those shown in FIGS. 8 and 8A.

System 70A comprises a first oil passage 94 that delivers oil to passages L for lubrication. System 70A further comprises a second oil passage 96 that delivers oil to boost passages B. Flow selector valve 80 in FIG. 11 has a different construction from its FIG. 10 counterpart although it remains under the control of EEC 82. Accumulator 76 holds a volume of oil under boost pressure until such time as a connecting rod length change is commanded by EEC 82 operating valve 80 to the position shown in FIG. 11.

FIG. 11 shows a condition where oil is delivered to the connecting rods via both passages 94, 96. Pump 72 is pumping oil through passage 94 at non-boosted pressure, limited by relief valve 90. At the same time, accumulator 76 is delivering oil at boosted pressure through passage 96. This corresponds to a condition of increased pressure delivery to all connecting rods to unlock the locked mechanism in each in each connecting rod while the other locking mechanism remains unlocked, thereby allowing an ensuing length change.

When EEC 82 operates valve 80 to its other position, accumulator 76 is disconnected from passage 96. Relief valve 92 aids in quickening the pressure drop in passage 96. Now only the pressure supplied by pump 72 is delivered to the connecting rods, allowing the mechanism that had reminded unlocked to automatically lock upon completion of the length change.

When the effective length of a connecting rod is to be changed, it is believed important to accomplish the length change, and to re-lock the connecting rod to the bearing retainer, within one engine cycle. Failure to re-lock the connecting rod may create an undesirable instability that is detrimental to desired engine operation. For ensuring unlocking and re-locking within one engine cycle in the case of the embodiment of FIG. 7 for example, hydraulic pressure in the oil sac volume between elements 36C1 and 36C2 should be completely filled and the boost pressure substantially maintained for the duration of the length change especially as the elements move apart. As the elements move apart, the oil sac volume increases, creating a need for the immediate introduction of additional oil to continue application of the hydraulic pressure that is needed to force the elements increasingly apart. In order to accomplish this properly, channel 44 of bearing retainer 24, and the passage from it to the locking mechanism, should have sufficient cross sectional area to impose no significant restriction on the volumetric flow rate needed to continue spreading the elements apart within a specified time limit.

For a particular engine, one engine cycle may occur with in a time span as short as 7.5 milliseconds or as long as 20 milliseconds, depending on engine speed for a particular engine. In order to accomplish the necessary movement of the locking mechanism elements within one engine cycle when the engine is running fastest, the inertial masses of the elements should be as small as possible, consistent with adequate strength to assure durability over the service life of an engine. Moreover, fictional forces between the elements and the through-holes and bores within which the elements move should be minimized. These considerations call for both the bearing retainer and locking elements to be a very high hardness and to withstand shearing loads and resist deformation. A hardened alloy steel, Rc 50/55 hardness for example, is believed to be a suitable material for the movable elements, and a hardened steel sleeve insert, Rc 45/50 hardness for example, is believed suitable for the through-holes and bores within which the movable elements are disposed. Confronting surfaces may be coated with a solid film lubricant coating polished smooth to a surface finish of 0.1–0.3 micron. And as noted earlier, inertial mass can be reduced by a hollowing those portions of the movable elements except at the location where the elements are subjected to shearing stress and their full cross sections are maintained.

Other possible materials include siliconized carbon fiber, essentially a carbon fiber reinforced silicon carbide, which can provide a weight reduction of around 70% in comparison to hardened steel and can exhibit sufficiently fast movement, approaching 7.0 millisecond time to unlock in response to application of hydraulic boost pressure.

Figure 7B:
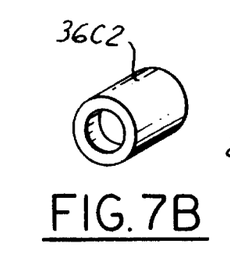
FIG. 7B is a perspective view of one element of FIGS. 7 and 7A by itself.
Figure 7C:
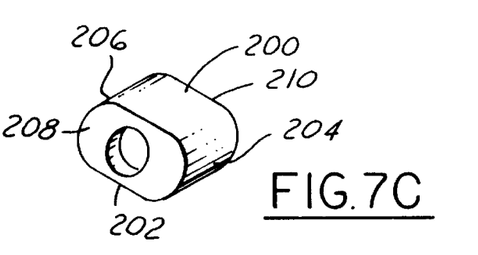
FIG. 7C is a perspective view of another form of element.

The various locking elements, and the various through-holes and bores within which the locking elements move, have heretofore been illustrated and described as having circular cross sections, as shown by the locking element 36C2 in FIG. 7B. FIG. 7C shows a movable element, such as a lock pin, having an oval cross section that may provide certain advantages over a circular cross section. The circumference of the oval cross section has opposite flat, parallel sides 200, 202 and rounded opposite ends 204, 206, which may be semi-circular. The element has opposite end faces 208, 210. The flat sides 200, 202 are arranged to be perpendicular to the longitudinal axis of the connecting rod that extends between small end 16 and big end 14. It is believed that the flat sides react longitudinal forces loads in a way that creates lower maximum Hertzian stresses than in the case of circular cross sections.

While a presently preferred embodiment has been illustrated and described, it is to be appreciated that the invention may be practiced in various forms within the scope of the following claims.

What is claimed is:

1. A variable compression ratio engine comprising a connecting rod via which a crankshaft that rotates about a crank axis reciprocates a piston within a cylinder, wherein the connecting rod comprises:

a first part and a second part that are relatively positionable to set an effective length of the connecting rod and hence a compression ratio for the cylinder; and a locking mechanism that is selectively operable to a locked condition for locking the first part to the second part in a position that sets a given effective length for the connecting rod and to an unlocked condition that allows the first and second parts to be relatively positioned to an effective length different from the given effective length;

wherein the first part comprises a through-hole that has a longitudinal axis parallel to the crank axis and the second part comprises a bore that has a longitudinal axis parallel to the crank axis;

wherein, the axis of the through-hole is co-axial with the axis of the bore when the connecting rod is set to the given effective length, and the axis of the through-hole is non-co-axial with the axis of the bore when the connecting rod is set to an effective length different from the given effective length;

and the locking mechanism comprises first and second elements that are operable to a first position representing the locked condition of the locking mechanism and to a second position representing the unlocked condition of the locking mechanism;

wherein, with the first and second parts positioned to set the connecting rod to the given effective length and the first and second elements in the first position, each element bridges a respective end of the through-hole and a respective portion of the bore, thereby locking the first and second parts in the given effective length setting; and wherein, with the first and second elements in the second position, neither element bridges the respective end of the through-hole and the respective end of the bore.

2. A variable compression ratio engine as set forth in claim 1 in which the first element is disposed entirely within the through-hole and the second element is disposed entirely within the bore when the elements are in the second position.

3. A variable compression ratio engine as set forth in claim 2 in which the bore comprises opposite ends disposed at opposite ends of the through-hole, the first element bridges one end of the through-hole and one end of the bore when the elements are in the first position, the second element bridges the other end of the through-hole and the other end of the bore when the elements are in the first position, and further including a third element that is positionable within the other end of the bore to operate the first and second elements from one of their positions to the other of their positions.

4. A variable compression ratio engine as set forth in claim 3 in which the third element is positionable within the one end of the bore to operate the first and second elements from first position to second position when the third element moves in a direction toward the through-hole.

5. A variable compression ratio engine as set forth in claim 4 including a source of bias force urging the first element toward the one end of the bore.

6. A variable compression ratio engine as set forth in claim 5 in which the bias force source comprises a spring disposed within the other end of the bore resiliently urging the first element toward the one end of the bore.

7. A variable compression ratio engine as set forth in claim 1 including a bias force source urging the first element toward the one end of the bore.

8. A variable compression ratio engine as set forth in claim 1 in which the elements, the through-hole, and the bore have circular transverse cross sections.

9. A variable compression ratio engine as set forth in claim 1 in which the elements, the through-hole, and the bore have oval transverse cross sections that comprise flat opposite faces that are perpendicular to a longitudinal axis of the connecting rod.

10. A variable compression ratio engine as set forth in claim 1 including a further locking mechanism that is selectively operable to a locked condition for locking the first part to the second part in the position where the first and second parts have an effective length different from the given effective length and to an unlocked condition that allows the first and second parts to be relatively positioned from the position where the first and second parts have an effective length different from the given effective length to the position where the first and second parts have the given effective length.

11. A variable compression ratio engine as set forth in claim 10 in which the connecting rod connects to the crankshaft via a crank pin having an axis parallel to the crank axis, and the two locking mechanisms are disposed diametrically opposite each other about the crank pin axis.

12. A variable compression ratio engine as set forth in claim 10 in which the further locking mechanism comprises first and second elements that are operable to a first position representing the locked condition of the further locking mechanism and to a second position representing the unlocked condition of the further locking mechanism.

13. A variable compression ratio engine as set forth in claim 12 in which the first part comprises a further through-hole that has a longitudinal axis parallel to the crank axis, the second part comprises a further bore that has a longitudinal axis parallel to the crank axis, the first element of the further locking mechanism is disposed entirely within the further through-hole and the second element of the further locking mechanism is disposed entirely within the further bore when the elements of the further locking mechanism are in their second position.

14. A variable compression ratio engine as set forth in claim 1 in which the first part comprises a small end of the connecting rod via which the connecting rod is coupled to the piston.

15. A variable length connecting rod for reciprocating a piston within a cylinder of an engine in consequence of rotation of a crankshaft of the engine about a crank axis, wherein the connecting rod comprises:

a first part and a second part that are relatively positionable to set an effective length of the connecting rod; and wherein the first part comprises a first through-hole that has a longitudinal axis parallel to the crank axis and the second part comprises a first bore that has a longitudinal axis parallel to the crank axis;

wherein the first part comprises a second through-hole that has a longitudinal axis parallel to the crank axis and the second part comprises a second bore that has a longitudinal axis parallel to the crank axis;

wherein, the axis of the first through-hole is co-axial with the axis of the first bore when the first and second parts are positioned to set a first effective length for the connecting rod but is non-co-axial with the axis of the first bore when the first and second parts are positioned to set a second effective length for the connecting rod;

wherein, the axis of the second through-hole is non-co-axial with the axis of the second bore when the first and second parts are positioned to set the first effective length for the connecting rod but is co-axial with the axis of the second bore when the first and second parts are positioned to set the second effective length for the connecting rod;

a first locking mechanism that acts via the first through-hole and the first bore for releasably locking the two parts in the first effective length setting; and a second locking mechanism that acts via the second through-hole and the second bore for releasably locking the two parts in the second effective length setting.

16. A variable length connecting rod as set forth in claim 15 wherein each locking mechanism comprises respective first and second elements;

with the first and second parts positioned to set the connecting rod to the first effective length, each element of the first locking mechanism bridges a respective end of the first through-hole and a respective portion of the first bore, thereby locking the first and second parts in the first effective length setting; and with the first and second parts positioned to set the connecting rod to the second effective length, each element of the second locking mechanism bridges a respective end of the second through-hole and a respective portion of the second bore, thereby locking the first and second parts in the second effective length setting.

17. A variable length connecting rod as set forth in claim 16 in which the first element of the first locking mechanism is disposed entirely within the first through-hole and the second element of the first locking mechanism is disposed entirely within the first bore when the first locking mechanism has been released from locking the two parts.

* * * * *